Nov. 4, 1969  L. S. KREBS ET AL  3,476,610

BATTERY HAVING TWO POSITIVE ACTIVE MATERIALS

Filed July 20, 1966

INVENTOR.
Luis Soto Krebs
BY Robert J. Dawson

ATTORNEY

United States Patent Office 3,476,610
Patented Nov. 4, 1969

3,476,610
BATTERY HAVING TWO POSITIVE ACTIVE
MATERIALS
Luis Soto Krebs, Santiago, Chile, and Robert J. Dawson,
Madison, Wis., assignors, by mesne assignments, to
ESB Incorporated, Philadelphia, Pa., a corporation
of Delaware
Filed July 20, 1966, Ser. No. 566,621
Int. Cl. H01m 21/00
U.S. Cl. 136—86                                    13 Claims

ABSTRACT OF THE DISCLOSURE

A battery having positive and negative electrodes, a separator and an electrolyte, in which the positive electrode comprises a principal active material and a secondary active material having a lower potential than the principal active material and a discharge product oxidizable by the principal active material. The secondary active material is present as an electrolyte impermeable masking layer which in the undischarged state isolates the principal active material from contact with the electrolyte and thereby providing improved stand and shelf life. The secondary active material is also present as a layer interposed between the principal active material and electrical contact means whereby the battery is characterized by a single potential discharge at the potential characteristic of the secondary active material discharged against the negative electrode.

---

Certain electrode active materials, which because of their high capacities and good rate capabilities are suitable for use as the principal active material in an electrode, but they are unstable in electrolyte. This instability generally manifests itself either in the active material going into solution in the electrolyte or by gassing. Either form of the active material decomposition limits the usefulness of the material for battery applications particularly when long periods of shelf life or stand are required prior to use.

It is an object of the present invention to provide a novel electrode having excellent stand and shelf life properties and further characterized by a single potential discharge.

It is another object of the present invention to provide a stable single potential discharge from a multivalent active material such as divalent silver oxide that discharges at two or more potentials.

It is a further object of the present invention to provide a new and improved button type cell construction characterized by a greater capacity than heretofore has been available.

In accordance with the present invention, there is provided an electrode comprising a principal active material and a secondary active material having a lower potential than the principal active material and a discharge product oxidizable by the principal active material. The secondary active material is present in part as electrolyte impermeable masking layer which in the undischarged state isolates the principal active material from contact with the electrolyte in which the electrode is to be used and which, upon discharge of the secondary active material in that layer, becomes electrolyte permeable whereby the electrolyte contacts the principal active material. The secondary active material is also present as an interposed layer forming the sole path for the flow of electrons to the principal active material for the development by the electrode throughout discharge of the potential characteristic of the secondary active material.

While not limited thereto the advantages of an electrode in accordance with the present invention can be illustrated by means of a divalent silver oxide electrode. As will be understood by those skilled in the art, while divalent silver oxide has an exceptionally high capacity, it evolves oxygen when in contact with aqueous solutions of alkaline electrolytes. This undesirable effect increases with increasing temperature. The gassing of divalent silver oxide creates serious problems in the sealing of cells incorporating this material. In addition, divalent silver oxide discharges at two potentials; first at approximately 1.8 volts vs. zinc in an alkaline electrolyte, and then at approximately 1.6 volts vs. zinc in an alkaline electrolyte. The voltage drop generally occurs when a divalent silver oxide cell is approximately half way through its useful life. Many types of battery operated electronic equipment cannot tolerate a voltage change of this magnitude. A divalent electrode in accordance with the present invention, however, will deliver all of its capacity at the monovalent silver oxide potential thus providing a substantially constant output voltage; and in addition, the gassing of the divalent silver oxide in the electrolyte is prevented until discharge of the electrode has begun. This extends the stand or shelf life capabilities of cells incorporating such electrodes and facilitates the sealing of such cells.

While the present invention has been described hereinbefore in connection with divalent silver oxide and monovalent silver oxide, the principles are applicable to other electrode active materials. Generally stated, the present invention provides a means for utilizing a highly active, high-capacity active material which tends to be unstable in electrolyte by inhibiting the instability of the material until discharge has begun, said discharge being at a lower potential than that normally developed by the material. By way of example of the applicability of the present invention to other active materials, potassium permanganate can be discharged at the lower potential of a more stable active material such as monovalent silver oxide or mercuric oxide. Similarly, divalent silver oxide can be discharged at the lower potential of mercuric oxide in addition to the lower potential of monovalent silver oxide as described hereinbefore.

A better understanding of the present invention may be had from the following description when read with reference to the accompanying drawings of which:

Figure 1:
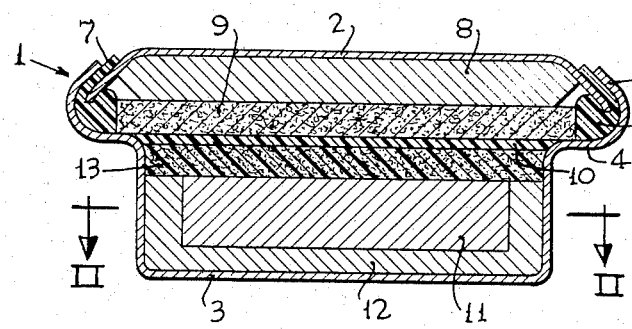
FIG. 1 is a cross-sectional view of a primary silver-zinc cell having a positive electrode in accordance with the present invention.

Referring now to FIG. 1, there is shown a sectional elevation of a silver-zinc cell, designated by the numeral 1, having a positive electrode in accordance with the present invention. The cell 1 is conventional in all respects with the exception of the construction of the positive electrode. The cell 1 has a two-part container comprising an upper section or cap 2 which houses the negative electrode, and a lower section or cup 3 which houses the positive electrode. As shown, the bottom cup 3 is formed with an annular shoulder 4 having a flange 5 which is crimped inward during assembly to seal the cell. The bottom cup 3 may be made of nickel plated steel, and the cap 2 may be made of tin plated steel. The cap 2 is insulated from the cup 3 and the flange 5 by means of a grommet 7 which is compressed between the cap 2 and the flange 5 during the crimping operation of cell assembly to provide a compression seal between these parts.

The grommet 7 may be made of a suitable resilient electrolyte resistant material such as neoprene.

The negative electrode of the cell 1 comprises a lightly compacted pellet 8 of finely divided amalgamated zinc. The zinc electrode 8 is seperated from the positive electrode by means of an electrolyte absorbent layer 9 and a membrane barrier 10. The electrolyte absorbent layer 9 may be made of electrolyte resistant, highly absorbent substance such as matted cotton fibers. Such a material is available commercially under the trademark "Webril." The barrier layer 10 may be a suitable semi-permeable material such as cellophane, or comprise a suitable organic carrier such as polyethylene or polyvinyl chloride having a polyelectrolyte homogeneously dispersed therethrough. Such a material is described and claimed in U.S. Patent No. 2,965,697, issued Dec. 20, 1960, to J. C. Duddy.

Figure 2:
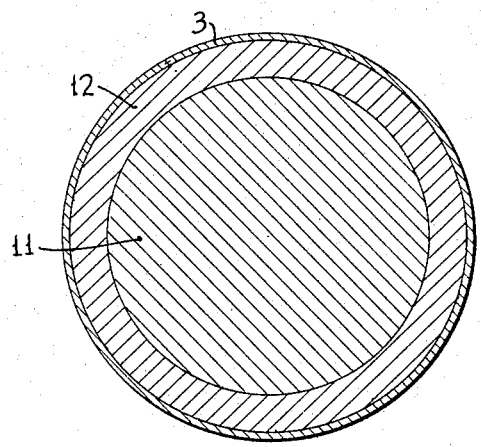
FIG. 2 is a top elevation taken along the lines of II—II of FIG. 1.

The positive electrode of the cell 1 comprises, in accordance with the present invention, a body 11 of divalent silver oxide which, adjacent to the inner surface of the bottom cup 3, is surrounded by a layer of monovalent silver oxide 12 and which is isolated at its top surface by a masking layer 13 of monovalent silver oxide dispersed in a substantially continuous phase throughout an electrolyte resistant binder. The body 11 of divalent silver oxide is the principal active material and comprises the majority of the active material in the electrode available for discharge. The monovalent silver oxide in the layer 12 and masking layer 13 is the secondary active material. As shown in FIG. 2, the layer 12 of monovalent silver oxide isolates the divalent silver oxide 11 from electronic contact with the bottom cup 3 which is the positive terminal of the cell and the electrode contact.

The masking layer 13 is electrolyte impermeable and isolates the body of divalent silver oxide 11 from contact with the cell electrolyte until substantially all of the monovalent silver oxide therein is discharged. The masking layer 13 is made electrolyte impermeable by dispersing monovalent silver oxide in a substantially continuous phase throughout a binder which is inert in the electrolyte and which resists penetration by the electrolyte. Porosity is developed throughout the masking layer 13 upon the discharge of the monovalent silver oxide in the masking layer as a result of the volumetric decrease which accompanies the reduction of monovalent silver oxide to metallic silver. By means of the masking layer 13, contact between the divalent silver oxide 11 and the cell electrolyte is prevented, and hence, gassing is prevented until cell discharge has proceeded to the point where substantially all the monovalent silver oxide in the masking layer 13 has been discharged to metallic silver. Since gassing of the divalent silver oxide is inhibited, the sealing of the cell is greatly facilitated and the cell will have excellent shelf life characteristics.

The cell 1 is characterized by a single potential discharge at the monovalent silver oxide-zinc potential. The monovalent silver oxide potential is achieved because monovalent silver oxide is present in both the masking layer 13 and the layer 12. During the early stages of discharge, the monovalent silver oxide in the masking layer 13 is reduced to metallic silver. The monovalent silver oxide in the layer 12 and the divalent silver oxide 11 take no active part in the cell reaction at this time since they are isolated from contact with the cell electrolyte. When electrolyte is made available to these portions of the electrode as discharge continues, metallic silver produced by the discharge of the monovalent silver oxide is reoxidized to monovalent silver oxide by the divalent silver oxide which in the process is itself reduced to monovalent silver oxide. The reduction and reoxidation reactions continue until all of the divalent silver oxide is reduced to the monovalent level and since the external circuit does not have electronic contact with the divalent silver oxide, the cell discharges in the external circuit at the monovalent oxide potential. Since the active materials in the masking layer 13 and isolating layer 12 are identical, the cell 1 discharges at a single potential.

The positive electrode of the cell may be formed in a number of ways. For example, the body of divalent silver oxide 11 may be formed as a pellet by first pelletizing finely divided divalent silver oxide powder in a suitable die. This pellet may be then centered in a bigger pellet die and the finely divided monovalent silver oxide compressed around it to form a composite pellet. The composite pellet can then be united with the barrier layer materials consolidated by means of pressure applied in situ within the bottom cup 3. For example, finely divided monovalent silver oxide powders can be coated with polystyrene by mixing the powder with a solution of polystyrene dissolved in a suitable solvent, and the solvent later being removed by evaporation. The coated powders thus produced may be consolidated by means of pressure to produce a structurized layer united with the preformed pellet described above. Simultaneously, the pressure will disperse the monovalent silver oxide therein into a continuous phase throughout the polyestyrene to form an electrolyte impermeable masking layer.

It is also possible to form the electrode by pelletizing a suitable quantity of divalent silver oxide powder and then chemically reducing its surface to monovalent silver oxide. A masking layer may then be added as described above. It is also possible to form the masking layer by dispersnig the silver oxide throughout a suitable plastic such as polyethylene, polypropylene and polytetrafluoroethylene or the like by means of heat and pressure in an intensive mixer such as a rubber mill. For example, the plastic binder material can be plasticized at a suitable temperature on the mill and the silver oxide added thereto while the binder is in the plasticized state. The material thus produced can then be sheeted to an appropriate thickness between calendaring rolls to produce sheet material from which the masking layers can be cut by means of a stamping operation. The masking layers thus produced can be united with the remainder of the electrode structure by means of pressure. Where the secondary active material in the masking layer 13 and isolating layer 12 are such as to provide a cell with an internal impedance higher than desired, a grid may be incorporated in the surface of the masking layer to reduce this impedance. A woven metallic screen is suitable for this purpose and where desired it may be welded or otherwise electrically connected to the cathode cup.

It should be noted that the thinner the masking layer 13 and the layer 12, the more divalent silver oxide can be included in the electrode thereby increasing its capacity. However, if the uni-potential discharge of the electrode is to be maintained, there can be no discontinuity in the monovalent layer 12 which would provide direct electronic contact between the divalent silver oxide body and the external circuit.

Figure 3:
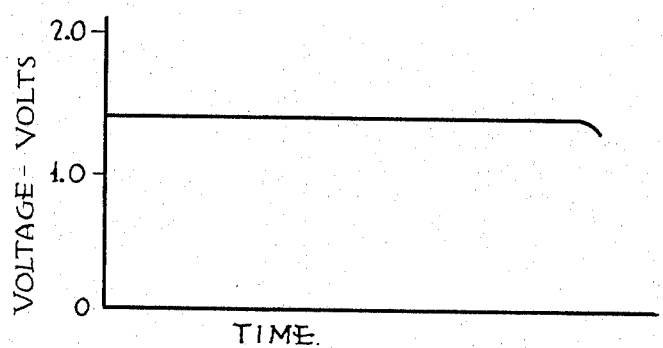
FIG. 3 is a curve showing the discharge characteristics of a primary silver-zinc cell in accordance with the present invention.

The curve in FIG. 3 demonstrates typical performance of a cell in accordance with the present invention. An example of a cell embodying the present invention is shown in FIG. 1. The negative electrode comprises lightly compacted battery grade metallic zinc amalgamated with 14% mercury. The cell is sealed with a neoprene rubber grommet. The separation utilized between the electrodes comprises a layer of Webril absorbent and a layer of cellophane. The cell has electrolyte formulated by dissolving 100 grams of potassium hydroxide and 16 grams of zinc oxide in 100 cc. of water.

The positive electrode of this cell in accordance with the present invention comprises a first pellet of divalent silver oxide consolidated in situ in the cathode cup by means of 15,000 lbs. per square inch of pressure. The masking layer comprises monovalent silver oxide coated with polystyrene. The coated particles of monovalent silver oxide are produced by mixing the particles in a solution of carbon tetrachloride containing polystyrene in the amount of 1% by weight of the monovalent silver oxide and then removing the carbon tetrachloride by means of evaporation. Following the coating of the monovalent silver oxide particles with polystyrene, the coated particles are placed on the divalent silver oxide pellet in the bottom cup and the electrode structurized by the applications of 40,000 lbs. per square inch pressure. This pressure disperses the monovalent silver oxide in the barrier layer into a substantially continuous phase throughout the polystyrene and makes the masking layer electrolyte impermeable.

An isolating layer of monovalent silver oxide is formed between the bottom and side walls of the cup of the cell and the body of divalent silver oxide. In the instant case the pellet can was made of silver plated steel.

In addition to the single potential discharge, cells of the type described in connection with FIG. 3 exhibited excellent stand characteristics.

Electrodes in accordance with the present invention have been constructed utilizing the electrode materials other than monovalent silver oxide and divalent silver oxide. For example, divalent silver oxide has been dischanged against zinc utilizing an isolating layer and masking layer incorporating mercuric oxide as the secondary active material. Similarly, potassium permanganate has been discharged against zinc at the potential of monovalent silver oxide and mercuric oxide utilizing these materials as the secondary active material. In this respect, the masking layers of these active materials have been particularly effective in preventing electrolyte contact with the potassium permanganate principal active material on prolonged stands. Inspection after several months of stand of cells so constructed, showed none of the electrolyte coloration characteristic of potassium permanganate.

From the foregoing, it can be seen that by means of the present invention there has been provided an electrode means for utilizing a highly active, high-capacity active material in a cell characterized by good stand characteristics and a discharge at a lower potential than that which normally characterizes the principal active material. As a result of this unique electrode design, it is possible to achieve higher capacity cells than heretofore have been available despite the instability in electrolyte of the principal active material of the positive electrode. Of equal importance is the fact that this high capacity has been achieved at a single potential.

In considering the present invention, it should also be noted that while zinc electrodes have been used as reference electrodes and for the negative electrodes in cells specifically described, this has been done for the purpose of ilustration only and not by way of limitations. An electrode with the present invention may be utilized where the electrode of the opposite polarity is of any conventional type.

Having described this invention that which is claimed as new is:

1. A battery comprising a negative electrode, a positive electrode including electrical contact means, a separator between said positive and negative electrodes, and an electrolyte contained substantially wholly within said separator and said negative electrode, said positive electrode comprising a principal active material and a secondary active material, said principal active material having a higher potental than said secondary active material, said secondary active material being stable in the electrolyte, a portion of said secondary active material being present in its charged state as a substantially electrolyte impermeable layer interposed between the principal active material and the separator and negative electrode components which contain electrolyte, and a second portion of secondary active material being interposed between said principal active material and said electrical contact means as a continuous layer in physical and electrical contact with said principal active material physically isolating said principal active material from said electrical contact means.

2. A battery in accordance with claim 1 in which the secondary active material forming the electrolyte impermeable layer is the same material as the secondary active material forming the continuous layer between the principal active material and the electrical contact means, whereby the battery is characterized by a single potential discharge at the potential characteristic of the secondary active material discharged against the negative electrode.

3. A battery in accordance with claim 1 in which the secondary active material forming the electrolyte impermeable layer is dispersed in a substantially continuous phase throughout a binder resin.

4. A battery in accordance with claim 1 in which the principal active material is selected from divalent silver oxide or potassium permanganate.

5. A battery in accordance with claim 1 in which the secondary active material is selected from monovalent silver oxide or mercuric oxide.

6. A battery in accordance with claim 2 in which the secondary active material is selected from monovalent silver oxide or mercuric oxide.

7. A battery in accordance with claim 6 in which the principal active material is divalent silver oxide.

8. A battery comprising a negative electrode, a positive electrode including electrical contact means, a separator between said positive and negative electrodes, and an alkaline electrolyte contained substantially wholly within said separator and said negative electrode, said positive electrode comprising a divalent silver oxide principal active material and a monovalent silver oxide secondary active material, a portion of said monovalent silver oxide being present in its charged state as an electrolyte impermeable layer interposed between the divalent silver oxide and the separator and negative electrode components which contain electrolyte, and the remainder of said monovalent silver oxide being interposed between said divalent silver oxide and said electrical contact means as a continuous layer physically isolating said divalent silver oxide from said electrical contact means.

9. A battery in accordance with claim 8 in which the negative electrode contains zinc active material.

References Cited

UNITED STATES PATENTS

| | | | |
|---|---|---|---|
| 2,542,710 | 2/1951 | Ruben | 136—107 |
| 2,795,638 | 6/1957 | Fischbach | 136—120 |
| 2,837,590 | 6/1958 | Rhyne | 136—100 |
| 3,057,944 | 10/1962 | Ruetschi et al. | 136—20 |

WINSTON A. DOUGLAS, Primary Examiner

A. SKAPARS, Assistant Examiner

U.S. Cl. X.R.

136—111